US011108961B2

(12) United States Patent
Shin et al.

(10) Patent No.: US 11,108,961 B2
(45) Date of Patent: Aug. 31, 2021

(54) ELECTRONIC DEVICE FOR CONTROLLING SHAKING OF LENS PART CONTAINED IN CAMERA MODULE AND OPERATION METHOD FOR ELECTRONIC DEVICE

(71) Applicant: Samsung Electronics Co., Ltd., Suwon-si (KR)

(72) Inventors: Junseok Shin, Gunpo-si (KR); Sungmin Kim, Pocheon-si (KR); Yeonhak Kim, Suwon-si (KR); Sewon Kim, Suwon-si (KR); Dongyoul Park, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/615,637

(22) PCT Filed: Jun. 25, 2018

(86) PCT No.: PCT/KR2018/007173
§ 371 (c)(1),
(2) Date: Nov. 21, 2019

(87) PCT Pub. No.: WO2019/035550
PCT Pub. Date: Feb. 21, 2019

(65) Prior Publication Data
US 2020/0169665 A1 May 28, 2020

(30) Foreign Application Priority Data
Aug. 18, 2017 (KR) .................. 10-2017-0104550

(51) Int. Cl.
*H04N 5/232* (2006.01)
*G03B 5/04* (2021.01)
*H04N 5/225* (2006.01)

(52) U.S. Cl.
CPC .......... *H04N 5/23287* (2013.01); *G03B 5/04* (2013.01); *H04N 5/2257* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS 6,279,374 B1 * 8/2001 Irokawa ............... G05B 19/404
73/1.79
2002/0163581 A1 * 11/2002 Kitazawa ........... H04N 5/23248
348/208.6

(Continued)

FOREIGN PATENT DOCUMENTS

JP 2006-301098 A 11/2006
JP 2008-045919 A 2/2008

(Continued)

*Primary Examiner* — William B Perkey
(74) *Attorney, Agent, or Firm* — Jefferson IP Law, LLP

(57) ABSTRACT

In an electronic device for controlling the shaking of a lens part of a camera module and an operation method for the electronic device according to various embodiments, the electronic device includes: a housing; a first camera that is accommodated in the housing and includes a first lens part capable of refracting light, reflected from an external object, through one surface of the housing, and a first optical image stabilizer (OIS) capable of compensating for the shaking of the first lens part; a second camera that is accommodated in the housing and includes a second lens part capable of refracting light, reflected from the external object, through the one surface and a second optical image stabilizer capable of compensating for the shaking of the second lens part; and a control circuit, wherein the control circuit may be configured to: acquire an image of the external object by using the first camera and the second camera; acquire a first signal, (Continued)

corresponding to the shaking of the first lens part, and a second signal, corresponding to the shaking of the second lens part, while acquiring the image; verify compensation information that is compensated so that the movement amount of the first lens part or the second lens part according to a signal corresponding to a predetermined movement amount of the first lens part or the second lens part is substantially the same as the predetermined movement amount; determine a control signal on the basis of the first signal, the second signal, and the compensation information; and move the first lens part by using the first optical image stabilizer or the second lens part by using the second optical image stabilizer on the basis of the control signal. Various other embodiments are also possible.

9 Claims, 13 Drawing Sheets

(56) References Cited

U.S. PATENT DOCUMENTS

| | | |
|---|---|---|
| 2006/0245746 A1 | 11/2006 | Makii |
| 2011/0169920 A1 | 7/2011 | Ryu et al. |
| 2012/0154550 A1 | 6/2012 | Takagi et al. |
| 2014/0132251 A1 | 5/2014 | Enomoto et al. |
| 2016/0007017 A1* | 1/2016 | Nishikawa ............... G03B 5/00 348/187 |
| 2016/0165137 A1* | 6/2016 | Kang ................. H04N 5/23287 348/208.4 |
| 2016/0295099 A1* | 10/2016 | Kasamatsu ............. H02P 25/06 |
| 2017/0045710 A1 | 2/2017 | Lee et al. |
| 2017/0126978 A1* | 5/2017 | Yun .................... H04N 5/23258 |
| 2018/0100985 A1* | 4/2018 | Maede ................... G01K 13/00 |
| 2018/0249082 A1* | 8/2018 | Saito .................. G02B 27/1066 |
| 2018/0275369 A1* | 9/2018 | Takahashi .......... H04N 5/23287 |
| 2018/0295286 A1* | 10/2018 | Maede ...................... G03B 5/02 |
| 2018/0343393 A1* | 11/2018 | Maede ..................... G03B 5/02 |
| 2019/0120214 A1* | 4/2019 | Brown ..................... G03B 5/02 |
| 2020/0053287 A1* | 2/2020 | Zhang ................ H04N 5/23258 |
| 2020/0169665 A1* | 5/2020 | Shin ......................... G03B 5/04 |

FOREIGN PATENT DOCUMENTS

| | | |
|---|---|---|
| JP | 2012-134609 A | 7/2012 |
| JP | 2014-186165 A | 10/2014 |
| JP | 2014-235377 A | 12/2014 |
| JP | 5875012 B2 | 3/2016 |
| KR | 10-0932175 B1 | 12/2009 |
| KR | 10-2011-0135502 A | 12/2011 |
| KR | 10-2015-0118310 A | 10/2015 |
| KR | 10-2017-0020212 A | 2/2017 |

* cited by examiner

ELECTRONIC DEVICE FOR CONTROLLING SHAKING OF LENS PART CONTAINED IN CAMERA MODULE AND OPERATION METHOD FOR ELECTRONIC DEVICE

TECHNICAL FIELD

Various embodiments of the disclosure relate to an electronic device for controlling the shaking of a lens unit included in a camera module and an operation method of the electronic device.

BACKGROUND ART

Various electronic devices, such as a smart phone, a tablet PC, a portable multimedia player (PMP), a personal digital assistant (PDA), a laptop personal computer (PC), and a wearable device are becoming popularized.

A function of capturing an image, among functions of an electronic device, has become very popular among users of an electronic device, and in capturing an image, various technologies for increasing the quality of the captured image have been widely popularized. In particular, in capturing an image using an electronic device, various techniques have been developed to prevent the quality of an image from being degraded due to the shaking of a user's hand holding the electronic device. For example, image stabilization technology for correcting the movement of a lens due to camera shaking has been developed, and is applied to various electronic devices.

Image stabilization technology is a technique for compensating for the shaking of an image of a subject due to vibration of a human body, such as camera shaking by a user during image capture. Image stabilization can be performed by detecting a vibration applied to a device through a plurality of angular velocity sensors mounted on an electronic device, such as a camera for example, and moving a lens or an image sensor according to the angular velocity and direction of the detected vibration.

DESCRIPTION OF INVENTION

Technical Problem

One of available image stabilization technologies may include performing image stabilization by detecting a change in a magnetic field caused by the movement of a lens due to the camera shaking, using a Hall sensor and moving the lens in a direction of cancelling out the movement of the lens.

In many cases, a signal output from a Hall sensor according to the movement of the lens has nonlinear signal characteristics, and in controlling the lens, the lens does not move as much as the intended amount of lens movement, and moves more or less than the intended movement, and thus may cause a decrease in a suppression ratio, which is one of the measures of performance of image stabilization.

Further, a problem may occur in that a lens is displaced from location where the lens is to be moved for camera shake correction, and thus is in another, unintended location.

Solution to Problem

An electronic device according to various embodiments of the disclosure may include: a housing; a first camera received in the housing, and including a first lens unit capable of refracting light, reflected from an external object, through one surface of the housing, and a first optical image stabilizer (OIS) capable of correcting the shaking of the first lens unit; a second camera received in the housing, and including a second lens unit capable of refracting light, reflected from the external object, through the one surface of the housing and a second optical image stabilizer capable of correcting the shaking of the second lens unit; and a control circuit, wherein the control circuit is configured to: acquire an image of the external object using the first camera and the second camera; acquire a first signal corresponding to the shaking of the first lens unit and a second signal corresponding to the shaking of the second lens unit during acquisition of the image; identify correction information obtained by such a correction that a designated amount of movement of the first lens unit or the second lens unit is substantially the same as an amount of movement of the first lens unit or the second lens unit according to a signal corresponding to the designated amount of movement of the first lens unit or the second lens unit; determine a control signal on the basis of the first signal, the second signal, and the correction information; and move the first lens unit using the first optical image stabilizer or move the second lens unit using the second optical image stabilizer, on the basis of the control signal.

An operation method of an electronic device according to various embodiments of the disclosure may include: applying a signal corresponding to a designated amount of movement of an optical image stabilizer to a control circuit configured to control at least one optical image stabilizer (OIS) configured to correct the shaking of a lens unit refracting light reflected from an external object; identifying an amount of movement of the optical image stabilizer according to a signal corresponding to the designated amount of movement; and performing linearization correction of the signal corresponding to the designated amount of movement, on the basis of the result of identification.

The operation method of the electronic device according to various embodiments of the disclosure may further include performing the correction of the signal until the lens unit moves to the center of a camera module including the lens unit and the optical image stabilizer.

An electronic device according to various embodiments of the disclosure may include: a housing; a camera received in the housing, and including a lens unit capable of refracting light, reflected from an external object, through one surface of the housing, and an optical image stabilizer (OIS) capable of correcting the shaking of the lens unit; and a control circuit, wherein the control circuit is configured to: acquire an image of the external object by using the camera; acquire a signal corresponding to the shaking of the lens unit; identify correction information obtained by such a correction that an amount of movement in a first section of the lens unit is the same as an amount of movement in a second section of the lens unit; and move the lens unit, on the basis of the signal and the correction information, by the optical image stabilizer in a direction in which the shaking of the lens unit is reduced.

Advantageous Effects of Invention

An electronic device and an operation method of the electronic device according to various embodiments of the disclosure may move a lens as much as the intended amount of lens movement by performing linearization correction of a signal output from a Hall sensor.

An electronic device and an operation method of the electronic device according to various embodiments of the disclosure may perform correction to reduce a center error of a signal output from a Hall sensor, and thus increase a movable distance (stroke margin) of a lens.

An electronic device and an operation method of the electronic device according to various embodiments of the disclosure may perform correction to reduce a center error of a signal output from a Hall sensor, and thus reduce an assembly tilt tolerance (static tolerance) in a camera (such as a dual camera) including a plurality of lens assemblies.

MODE FOR CARRYING OUT THE INVENTION

Figure 1:
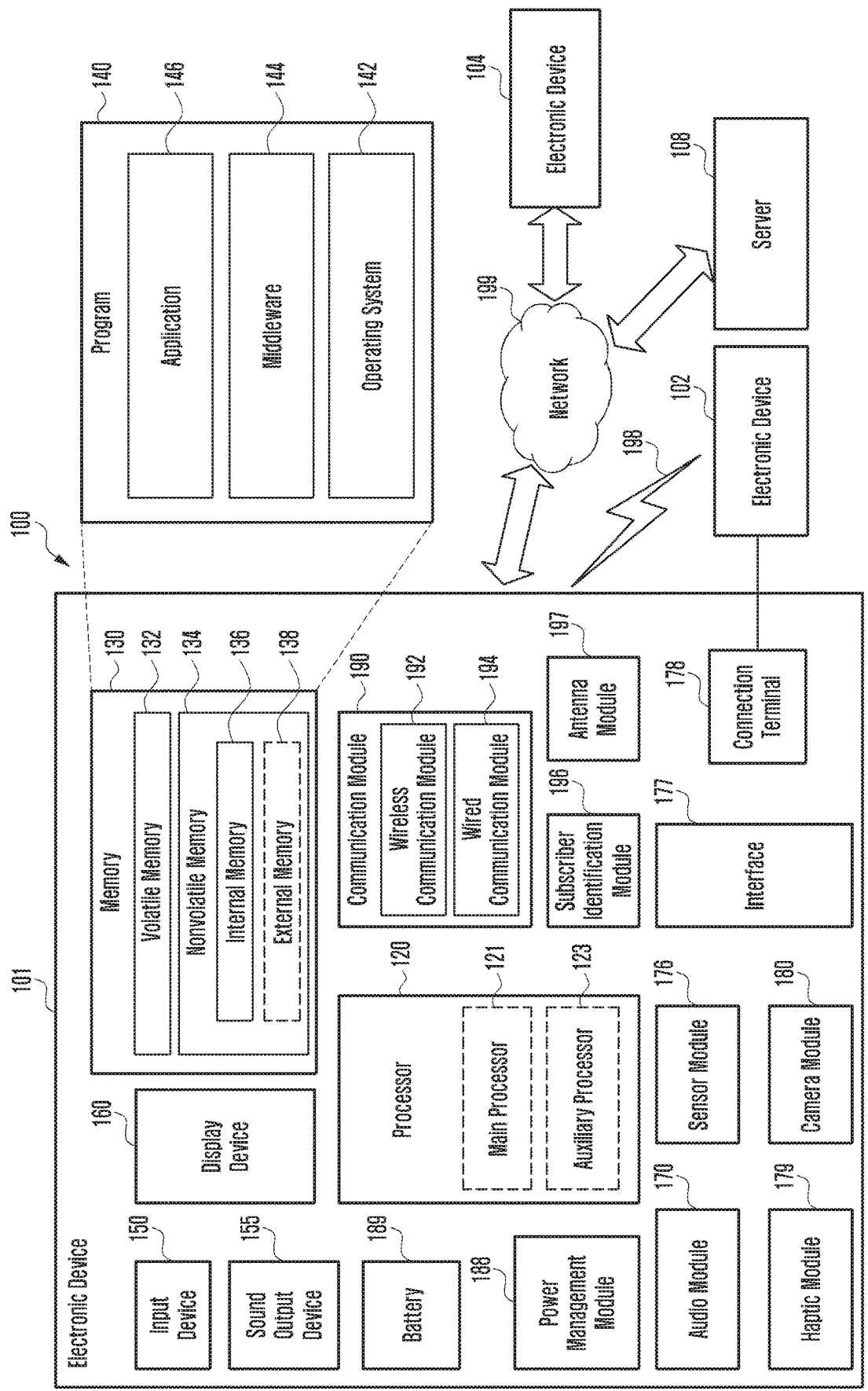
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
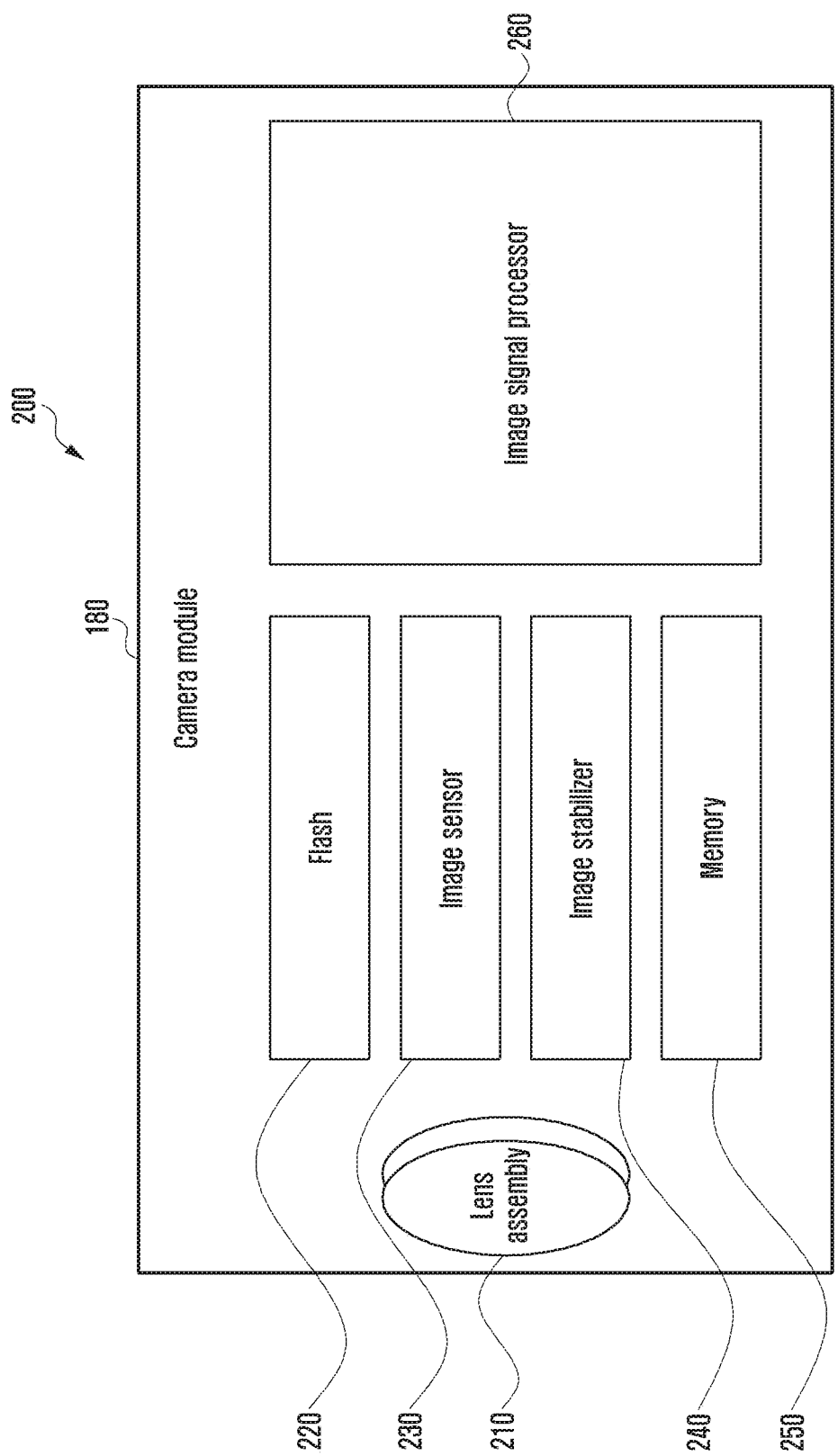
FIG. 2 is a block diagram of a camera module of an electronic device according to various embodiments of the disclosure.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
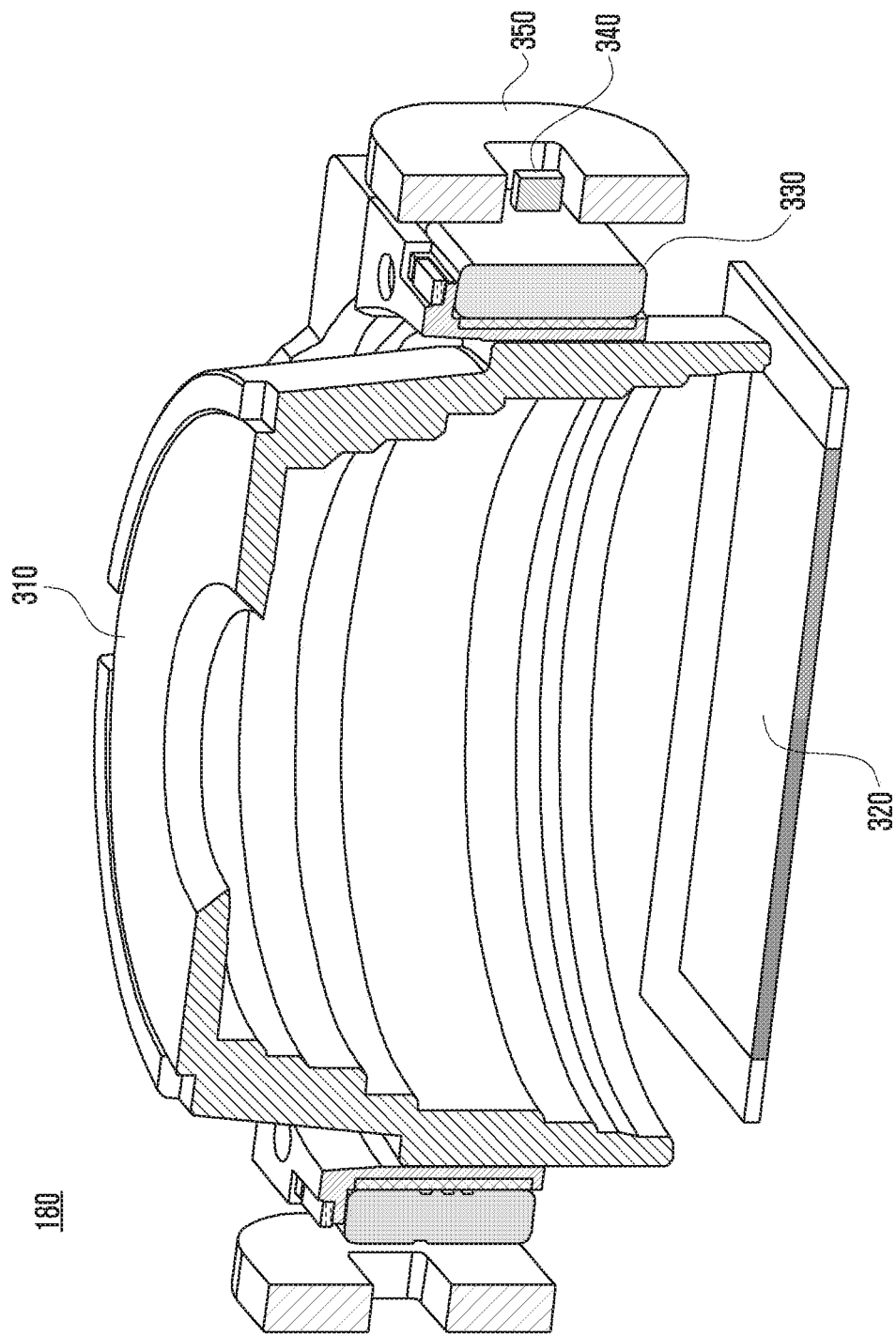
FIG. 3 is a sectional view of a camera module of an electronic device according to various embodiments of the disclosure.

FIG. 3 illustrates a camera of an electronic device according to various embodiments of the disclosure.

Referring to FIG. 3, a camera (e.g., the camera module 180 of FIG. 1) of an electronic device (e.g., the electronic device 100 of FIG. 1) according to various embodiments of the disclosure may include a lens unit 310, an image sensor 320, a magnet 330, a Hall sensor 340, and a coil 350.

The lens unit 310 (e.g., the lens assembly 210 of FIG. 2) may collect light emitted or reflected from a subject whose image is to be captured. Light emitted or reflected from the subject may be refracted while passing through the lens unit 310, and the refracted light or passing light may reach the image sensor 320. According to various embodiments of the disclosure, the lens unit 310 may include a plurality of lenses. The plurality of lenses may be implemented as convex or concave lenses, and may be implemented in a form in which the convex and concave lenses are arranged in a specific order.

The image sensor 320 (e.g., the image sensor 230 of FIG. 2) may convert light transmitted through the lens unit 310 into an electrical signal. The image sensor 320 may generate an image using the electrical signal generated by conversion of light.

An electronic device 100 according to various embodiments of the disclosure may include an optical image stabilizer (e.g., the image stabilizer 240 of FIG. 2) capable of correcting lens movement that may occur due to shaking of the electronic device 100. The optical image stabilizer 240 may include a magnet 330, a Hall sensor 340, and a coil 350.

According to various embodiments of the disclosure, the magnet 330 may refer to an object emitting a magnetic field.

According to various embodiments of the disclosure, the magnet 330 may be attached to a part of the lens unit 310. In the case where the magnet 330 is attached to the lens 310, the shaking of the lens unit 310 that may occur due to the shaking of the electronic device 100 may cause movement of the magnet 330. The movement of the magnet 330 may change the strength of the magnetic field measured by the Hall sensor 340. According to various embodiments of the disclosure, the magnet 330 may have a magnetic polarity arranged in a direction perpendicular to an optical axis of the lens unit 310. For example, a line from an N-pole to an S-pole (or a line from the S-pole to the N-pole) of the magnet 330 may be perpendicular to an optical axis (e.g., a line perpendicular to the lens).

The Hall sensor 340 may refer to a sensor implemented as an element having a characteristic in which a voltage (or current) changes according to the strength of a magnetic field. According to various embodiments of the disclosure, the Hall sensor 340 may detect a change in the strength of the magnetic field due to the movement of the magnet 330. The Hall sensor 340 may generate a signal corresponding to the shaking of the lens unit 310. According to various embodiments of the disclosure, the Hall sensor 340 may detect a change in the strength of the magnetic field that occurs due to the shaking of the lens unit 310, and may generate an electrical signal corresponding to the change in the strength of the magnetic field.

The camera 180 of the electronic device 100 according to various embodiments of the disclosure may move the lens unit 310 according to a signal output from the Hall sensor 340. For example, the electronic device 100 may acquire information about the shaking of the lens unit 310 on the basis of a signal output from the Hall sensor 340. The camera 180 may control an optical image stabilizer so as to cancel the shaking of the lens 310 on the basis of the information about the shaking of the lens 310. For example, in the case of moving the lens unit 310 in a direction opposite the direction in which the lens unit 310 is shaken, the lens unit 310 may be maintained as if it were in a stationary state due to a movement of the shaking of the electronic device 100 and a movement under the control of the optical image stabilizer.

To this end, a camera (e.g., the camera 180 of FIG. 1) may be provided with a coil 350. In the case where current is applied to the coil 350, a solenoid force may be generated by the coil 350. The movement of the lens unit 310 may be controlled by the solenoid force generated by the coil 350.

Figure 4A:
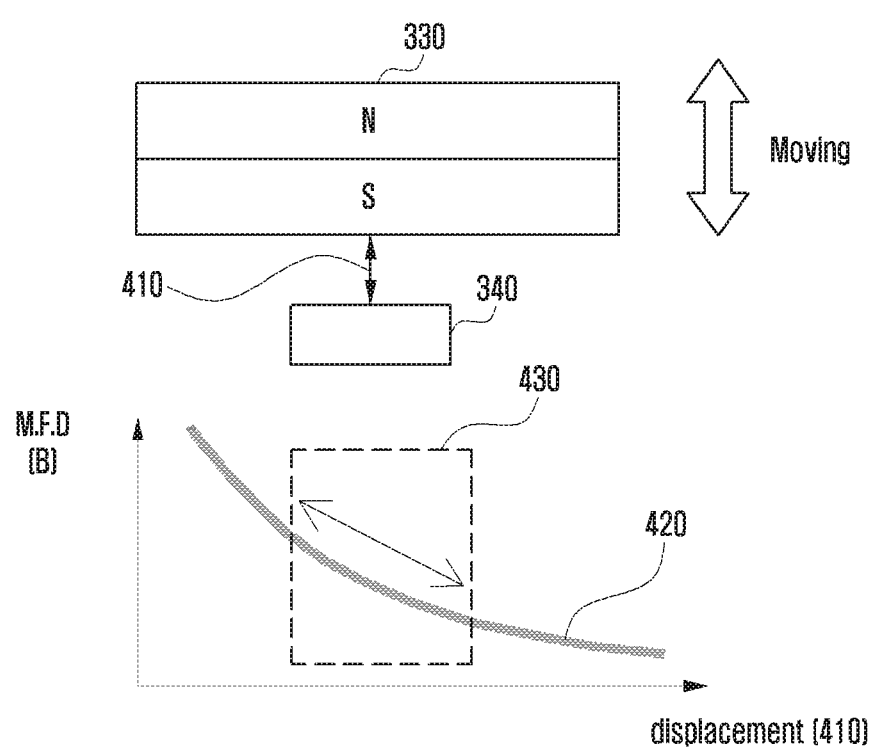
FIGS. 4A and 4B illustrate a signal output from an optical image stabilizer of a camera of an electronic device.
Figure 4B:
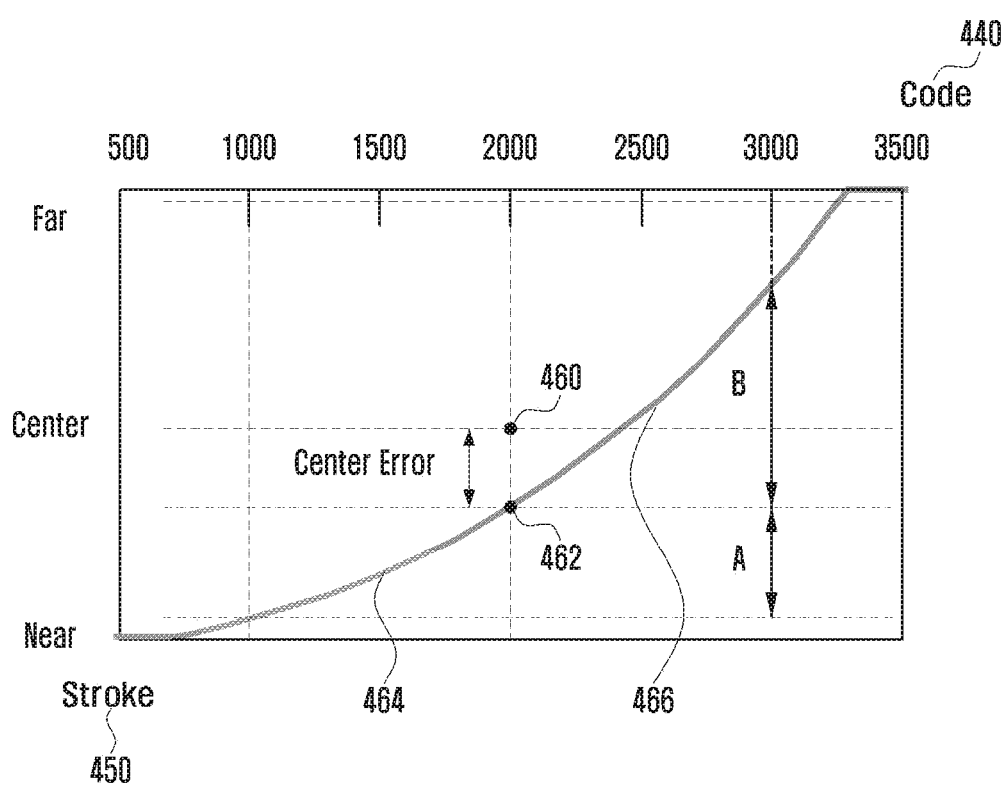

FIGS. 4A and 4B illustrate a signal output from an optical image stabilizer of a camera of an electronic device.

Referring to FIG. 4A, illustrated is a graph showing the strength of a magnetic field measured by a Hall sensor (e.g., the Hall sensor 340 of FIG. 3) while a magnet (e.g., the magnet 330 of FIG. 3) attached to a lens unit (e.g., the lens unit 310 of FIG. 3) is moving.

According to various embodiments of the disclosure, the magnet 330 may be moved due to the movement of the lens unit 310. The movement of the lens unit 310 may be caused by the movement (for example, shaking of the electronic device 100, etc.) of an electronic device (e.g., the electronic device 100 of FIG. 1).

According to various embodiments of the disclosure, a distance 410 between the magnet 330 and the Hall sensor 340 may change due to the movement of the magnet 330. As the distance 410 between the magnet 330 and the Hall sensor 340 changes, the strength of a magnetic field measured by the Hall sensor 340 may also change. FIG. 4A illustrates a change in the strength of the magnetic field (or magnetic flux density (MFD)) measured by the Hall sensor 340 while the distance 410 between the magnet 330 and the Hall sensor 340 changes.

Referring to FIG. 4A, the magnetic field strength 420 in relation to the distance 410 between the magnet 330 and the Hall sensor 340 is shown. In particular, it may be identified that a portion 430 in which the movement of the lens unit 310 is controlled by an optical image stabilizer (e.g., the image stabilizer 240 of FIG. 2) according to various embodiments of the disclosure is nonlinear.

According to various embodiments of the disclosure, in the case where the magnetic field strength 420 is nonlinear, an optical image stabilizer may have an error while moving the lens unit 310. The kind of error that occurs will be described with reference to FIG. 4B.

FIG. 4B illustrates a graph showing a relationship between a movement amount 450 that a lens unit 310 actually moves and a signal 440 corresponding to a designated amount of movement of the lens unit 310.

According to various embodiments of the disclosure, a signal 440 corresponding to a designated movement amount of the lens unit 310 may be implemented as a code having a value that increases in the direction from a region closest to a Hall sensor (e.g., the Hall sensor 340 of FIG. 3) to a region farthest from the Hall sensor 340. For example, a signal 440 corresponding to a region closest to the Hall sensor 340 may have a code 500, and a signal 440 corresponding to a region farthest away from the Hall sensor 340 may have a code 3500. According to various embodiments of the disclosure, an electronic device (e.g., the electronic device 100 of FIG. 1) may move the lens unit 310 by applying a signal having a code between code 500 and code 3500.

According to various embodiments of the disclosure, an optical image stabilizer (e.g., the image stabilizer 240 of FIG. 2) may move the lens unit 310 in response to a signal 440 corresponding to a designated movement amount of the lens unit 310. Referring to FIG. 4B, in the case where a signal corresponding to a designated movement amount has a code 2000, the optical image stabilizer 240 may move the lens unit 310 to a specific position 462. In the case where a signal corresponding to a designated movement amount has a code 500, the optical image stabilizer 240 may move the lens unit 310 to the position closest to a Hall sensor (e.g., the Hall sensor 340 of FIG. 3). In the case where a signal corresponding to a designated movement amount has a code 3500, the optical image stabilizer 240 may move the lens unit 310 to the position farthest from the Hall sensor 340.

The curve shown in FIG. 4B is visibly nonlinear. For a nonlinear curve, the slope of a first section 464 to the left of the central position 462 and the slope of a second section 466 to the right of the central position 462 may be different from each other. For example, the slope of the first section 464 may be smaller than the slope of the second section 464. In this case, even if a signal difference corresponding to a designated movement amount in the first section and a signal difference corresponding to a designated movement amount in the second section are equal to each other (for example, 1000), the slope of the left section and the slope of the right section with reference to the central region 462 are different from each other, and thus distances by which the lens unit 310 actually moves in the left section and the right section may be different from each other.

For example, in the case where the magnitude of a signal corresponding to a designated movement amount in the first section 464 increases by 1000 (increases from 1000 to 2000), a distance by which the lens unit 310 actually moves may correspond to "A". On the other hand, in the case where the magnitude of a signal corresponding to a designated movement amount in the second section 464 increases by 1000 (increases from 2000 to 3000), a distance by which the lens unit 310 actually moves may correspond to "B", which is longer than "A". This may increase complexity in controlling the lens unit 310, and may cause a decrease in suppression performance of the optical image stabilizer 240.

In addition, referring to a graph showing a relationship between a movement amount 450 that the lens unit 310 actually moves and a signal 440 corresponding to a designated movement amount of the lens unit 310 shown in FIG. 4B, in the case where the lens unit is designated to move to the center of a camera (e.g., the camera 180 of FIG. 1), the lens unit 310 may actually move to a region 462 closer to the Hall sensor 340, rather than move to the center 460. The difference in the distance may be defined as a center error. In the case where the center error increases, an assembly tilt tolerance may increase in an electronic device having a plurality of camera modules (for example, an electronic device having a dual camera module).

Figure 5:
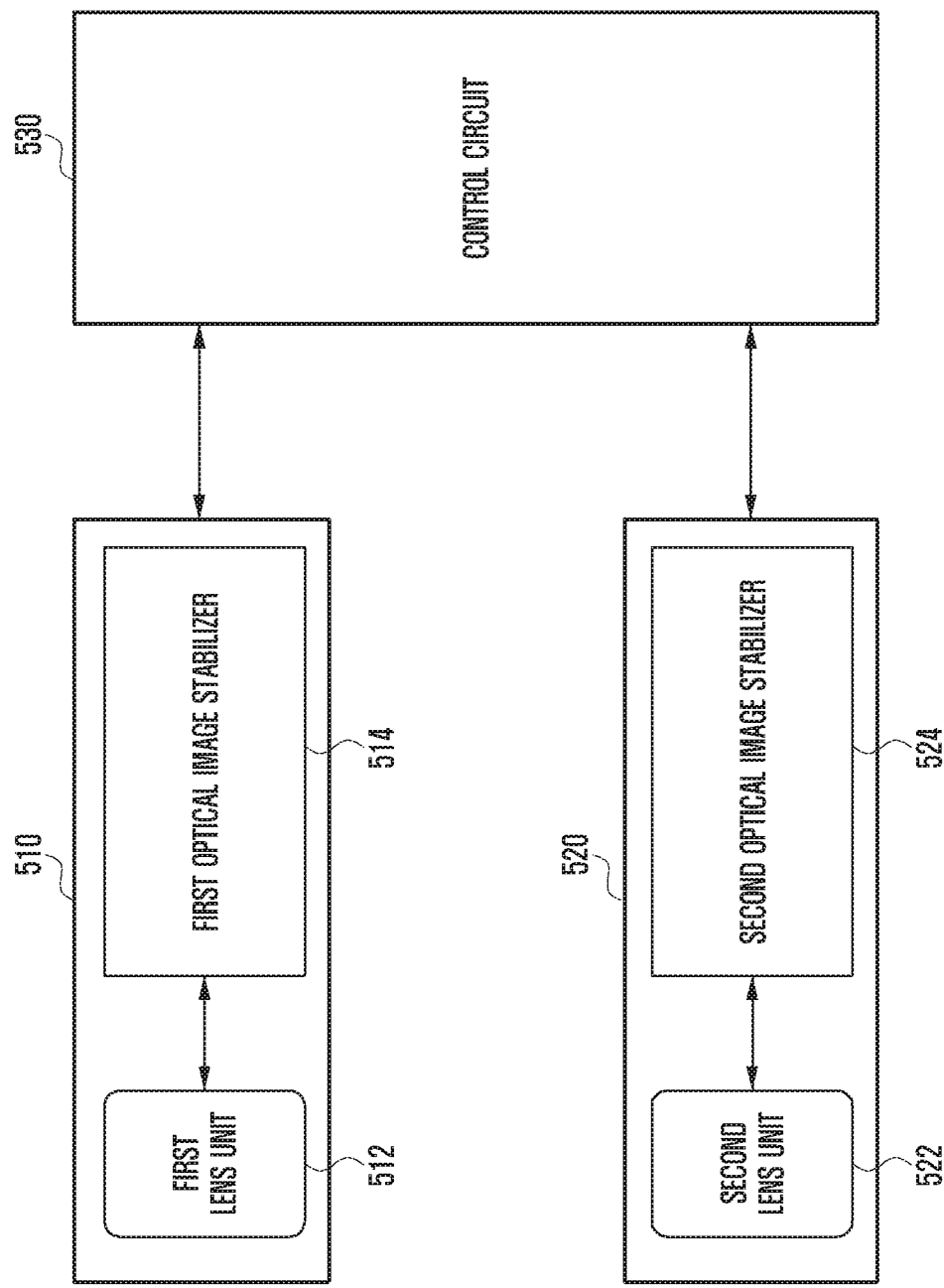
FIG. 5 is a block diagram of an electronic device according to various embodiments of the disclosure.

FIG. 5 is a block diagram of an electronic device according to various embodiments of the disclosure.

Referring to FIG. 5, an electronic device (e.g., the electronic device 100 of FIG. 1) according to various embodiments of the disclosure may include a housing (not shown), a first camera 510 (e.g., the camera module 180 of FIG. 1), a second camera 520 (e.g., the camera module 180 of FIG. 1), and a control circuit 530.

The housing (not shown) may refer to a frame for receiving elements of the electronic device 100. According to various embodiments of the disclosure, the housing (not shown) may receive a first camera 510 or a second camera 520.

The first camera 510 or the second camera 520 may photograph an external object using light that is reflected (or refracted) from an external object to be photographed.

According to various embodiments of the disclosure, the first camera 510 may include a first lens unit 512 and a first optical image stabilizer 514.

According to various embodiments of the disclosure, the first lens unit 512 may refract light reflected from an external object (or a subject) to be photographed, through one surface of a housing (not shown). The first optical image stabilizer 514 may correct the shaking of the first lens unit 512 due to the movement of the electronic device 100.

According to various embodiments of the disclosure, the second lens unit 522 may refract light reflected from an external object (or a subject) to be photographed, through one surface of a housing (not shown). The second optical image stabilizer 524 may correct the shaking of the first lens unit 522 due to the movement of the electronic device 100.

The first optical image stabilizer 514 or the second optical image stabilizer 524 may include an optical correction unit (not shown) capable of moving the first lens unit 512 or the second lens unit 522 in order to correct the shaking of the first lens unit 512 or the second lens unit 522. According to various embodiments of the disclosure, the optical correction unit may be implemented as an actuator.

The control circuit 300 may acquire an image of an external object using the first camera 510 and the second camera 520. The control circuit 300 may acquire a first signal corresponding to the shaking of the first lens unit 512 and a second signal corresponding to the shaking of the second lens unit 522 while the control circuit 300 acquires an image of an external object. The first signal and the second signal may include an electrical signal generated in response to a change in a magnetic field due to the shaking of the magnet (e.g., the magnet 330 of FIG. 3) generated by the shaking of the first lens unit 512 and the second lens unit 522, respectively, and a Hall sensor (e.g., the Hall sensor 340 of FIG. 3) has detected the change in the magnetic field.

The control circuit 530 may control the first optical image stabilizer 514 or the second optical image stabilizer 524. According to various embodiments of the disclosure, the control circuit 530 may generate a control signal to minimize the movement of the first lens unit 512 or the second lens unit 522 on the basis of the first signal or the second signal received by a Hall sensor (e.g., the Hall sensor 340 of FIG. 3) and correction information.

According to various embodiments of the disclosure, the correction information may imply information for linearizing a signal received by the Hall sensor 340. As described in FIG. 4B, due to nonlinearity of the signal received by the Hall sensor 340, the slope of the first section 464, located on the left side of the central position 462, and the slope of the second section 466 located on the right side of the central position 462, may be different from each other. In this case, even if a signal difference corresponding to a designated movement amount in the first section and a signal difference corresponding to a designated movement amount in the second section are equal to each other, the slope of the first section 464 and the slope of the second section 466 with reference to the central region 462 are different from each other, and thus distances by which the lens unit 310 actually moves in the first section and the second section may differ. The nonlinearity of a signal, which corresponds to a designated movement amount, may cause a difference between a movement amount in the first section 464 of the lens unit 310 and a movement amount in the second section 466.

According to various embodiments of the disclosure, in order to solve the difference between the movement amounts, the control circuit 530 may linearize the signal received by the Hall sensor 340. By linearizing the signal received by the Hall sensor 340, the slope corresponding to the first section 464 may be equal to the slope corresponding to the second section 466. Furthermore, in the case where a signal difference corresponding to a designated movement amount in the first section is equal to a signal difference corresponding to a designated movement amount in the second section, a distance that the lens unit moves in the first section 464 may be equal to a distance that the lens unit moves in the second section 466.

According to various embodiments of the disclosure, correction information may imply information for performing control such that a position to which the first lens unit 512 has moved according to a signal configured to move the first lens unit 512 to the central region of the first camera 510 is the central region of the first camera 510. As described in FIG. 4B, it has been identified that a position to which the first lens unit 512 moves according to a signal configured to move the first lens unit 512 to the central region of the first camera 510 is a region 462 that is closer to the Hall sensor 340 than to the central region 460 of the first camera 510. In order to solve this problem, the correction information may denote information for adding an offset to a signal output from the Hall sensor (for example, adding as much as a difference value between the central region 460 and the region 462 in which the first lens unit is actually located) such that a position to which the first lens unit 512 moves according to a signal configured to move the first lens unit 512 to the central region of the first camera 510 is the central region 460 of the first camera 510.

In order to generate correction information as described above, in the case where a signal configured to move the position of the first optical image stabilizer 510 or the second optical image stabilizer 520 to a preconfigured position of the first camera 510 or the second camera 520 is applied, the control circuit 530 may identify the position of the first optical image stabilizer 510 or the second optical image stabilizer 520. The control circuit 530 may generate correction information based on a difference between the actual position of the first optical image stabilizer 510 or the second optical image stabilizer 520 and a preconfigured position thereof. The preconfigured position may be the central position of the first camera 510 or the second camera 520.

In order to reduce the error, the control circuit 530 may control an optical correction unit to perform correction until the first lens unit 512 or the second lens unit 522 moves to the central position of the first camera 510 or the second camera 520. The optical correction unit (not shown) may control the first lens unit 512 or the second lens unit 522 based on a control signal transmitted from the control circuit 530. According to various embodiments of the disclosure, the control circuit 530 may perform control to move the first lens unit 512 or the second lens unit 522 to the central position of the first camera 510 or the second camera 520, and thus a distance (stroke margin) that the first lens unit 512 or the second lens unit 522 is movable can be increased. Further, in the case of an electronic device to which a dual camera is applied, an assembly tilt tolerance, indicating a distance between the center of the first lens unit 512 and the center of the second lens unit 522, can be reduced.

FIG. 5 illustrates an electronic device to which a dual camera using two cameras is applied, but the electronic device is not limited to any specific number of cameras. An electronic device according to various embodiments of the disclosure may be applied to the case where only one camera is used.

Figure 6A:
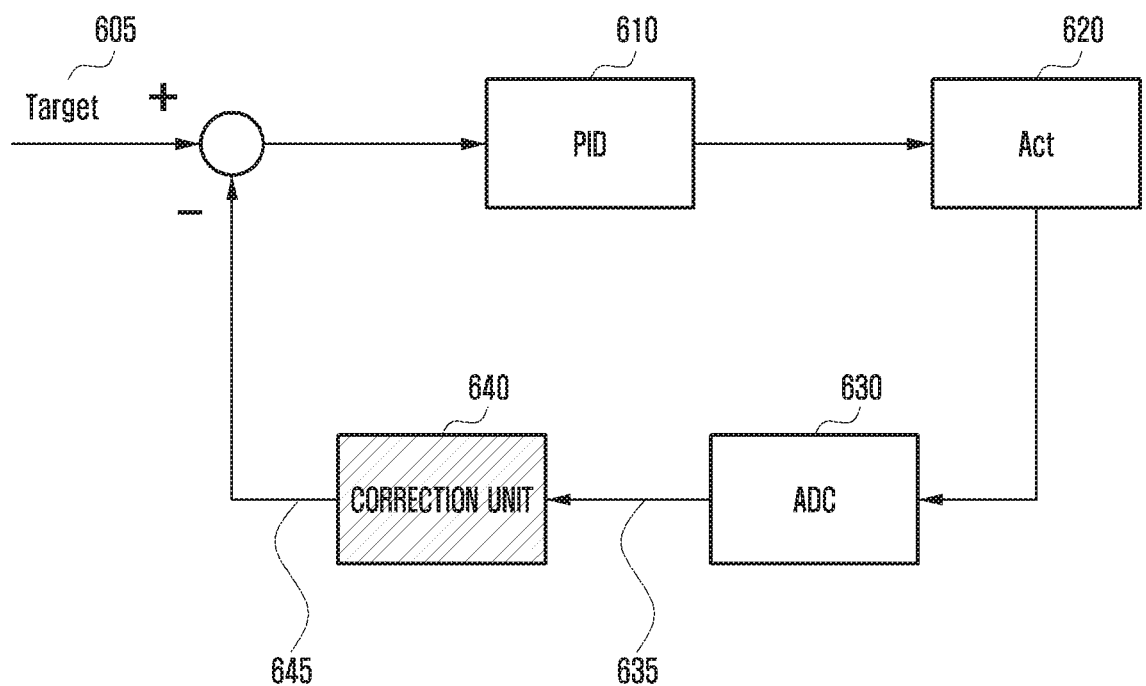
FIG. 6A is a block diagram of a control circuit in an electronic device according to various embodiments of the disclosure.

FIG. 6A illustrates an embodiment in which a control circuit performs correction in an electronic device according to various embodiments of the disclosure.

Referring to FIG. 6A, a control circuit (e.g., the control circuit 530 of FIG. 5) may include a PID controller 610, an ADC 630, and a correction circuit 640, and the control circuit 530 may be implemented using a feedback circuit.

According to various embodiments of the disclosure, a target signal 605 to be controlled may be input to a PID controller 610. The PID controller 610 may measure an output signal 645 output in response to an input of a target signal, and may perform control by comparing the output signal 645 with the target signal 605.

According to various embodiments of the disclosure, a signal output from the PID controller 610 may be input to the optical correction unit 620. The optical correction unit 620 may move a first lens unit (e.g., the first lens unit 512 of FIG. 5) or a second lens unit (e.g., the second lens unit of FIG. 5) by using a signal output from the PID controller 610. The optical correction unit 620 moves the first lens unit 512 or the second lens unit 522, and then a Hall sensor (e.g., the Hall sensor 340 of FIG. 3) may detect a magnetic field, the strength of which has changed due to a movement of the first lens unit 512 or the second lens unit 522. A signal measured by the Hall sensor 340 may be input to an analog-to-digital converter (ADC) 630.

Figure 6B:
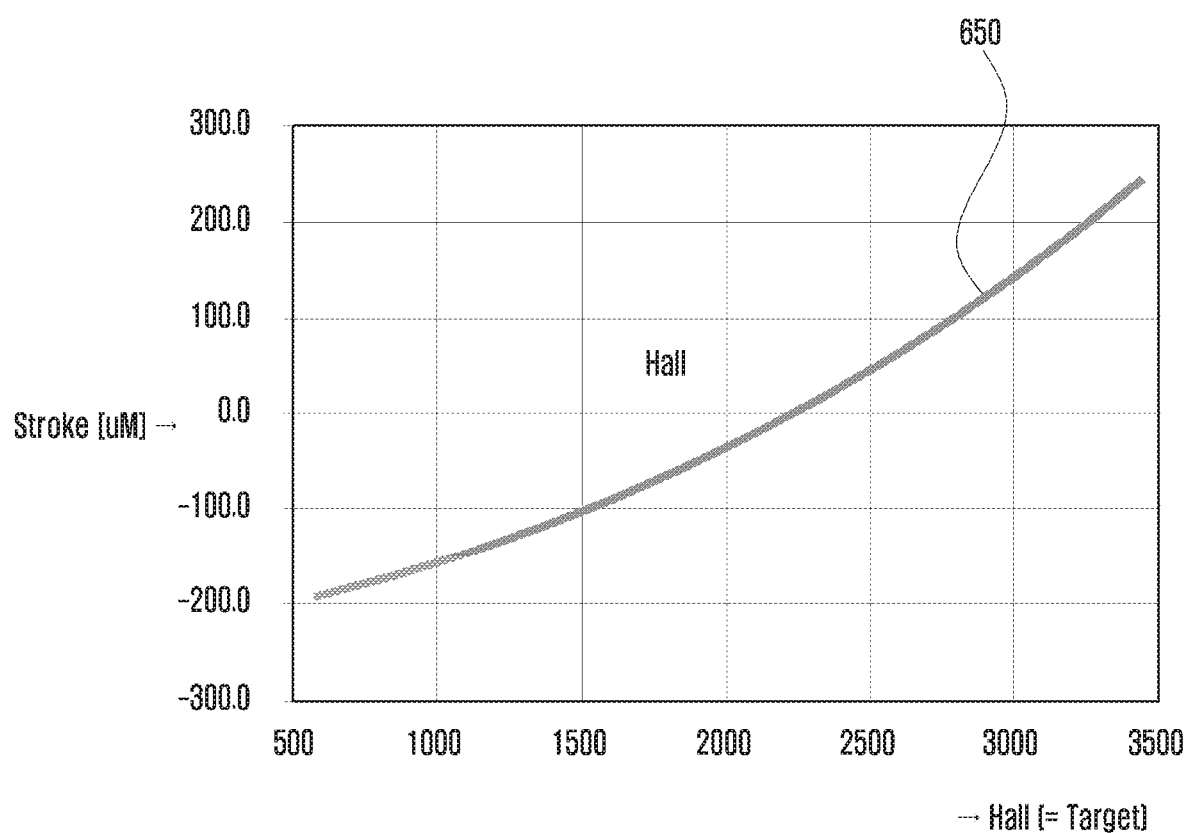
FIGS. 6B to 6D illustrate an embodiment in which signal correction is performed by a control circuit of an electronic device according to various embodiments of the disclosure.

According to various embodiments of the disclosure, the ADC 630 may convert an (analog) signal measured by the Hall sensor 340 into a digital signal. FIG. 6B is a diagram illustrating an embodiment of a signal 635 output from the ADC 630. As shown in FIG. 6B, it may be identified that a change in the moving distance of the lens unit 310 according to the (digital) signal measured by the Hall sensor 340 has a nonlinear form. According to various embodiments of the disclosure, the control circuit 530 may add a correction unit 640 to linearize the signal output from the Hall sensor 340. According to various embodiments of the disclosure, the correction unit 640 may be implemented in the form of software. For example, the correction unit 640 may be implemented in the form of firmware in a control circuit of a camera.

In linearization of a signal measured by the Hall sensor 340, various linearization techniques may be used. For example, the signal measured by the Hall sensor 340 may be linearized using any of various linearization techniques, such as a linearization technique using a Taylor series, a linearization technique for performing approximation using a line passing through the beginning and the end of a signal, a linearization technique for performing approximation using a line having the same slope as the line passing through the beginning and the end of the signal and tangent to a measured signal, and a linearization technique for performing approximation using a line having the same slope as the line passing through the beginning and the end of the signal and passing through the central region (e.g., 460).

Figure 6C:
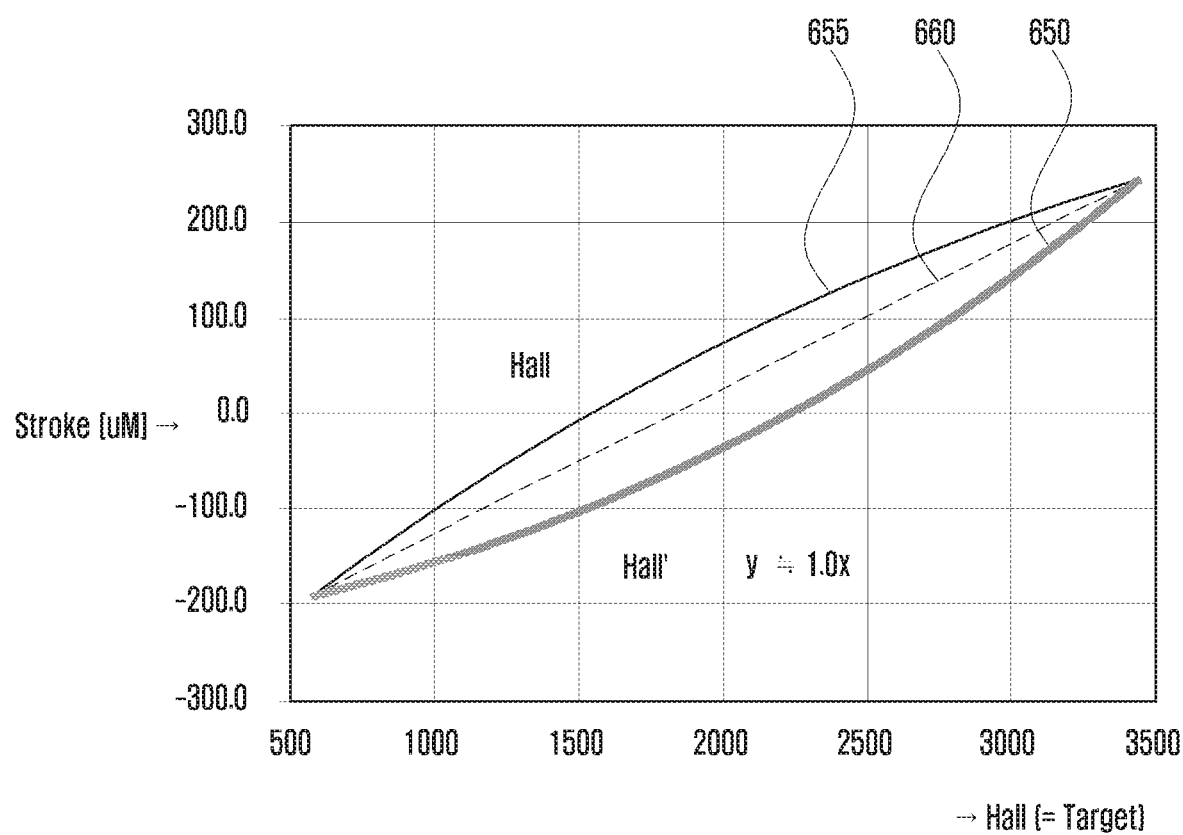

Referring to FIG. 6C, in order to linearize a signal 650 measured by the Hall sensor 340, a new signal 655 is generated, and a linearized signal 660 is generated by synthesizing the measured signal 650 and the new signal 655.

Figure 6D:
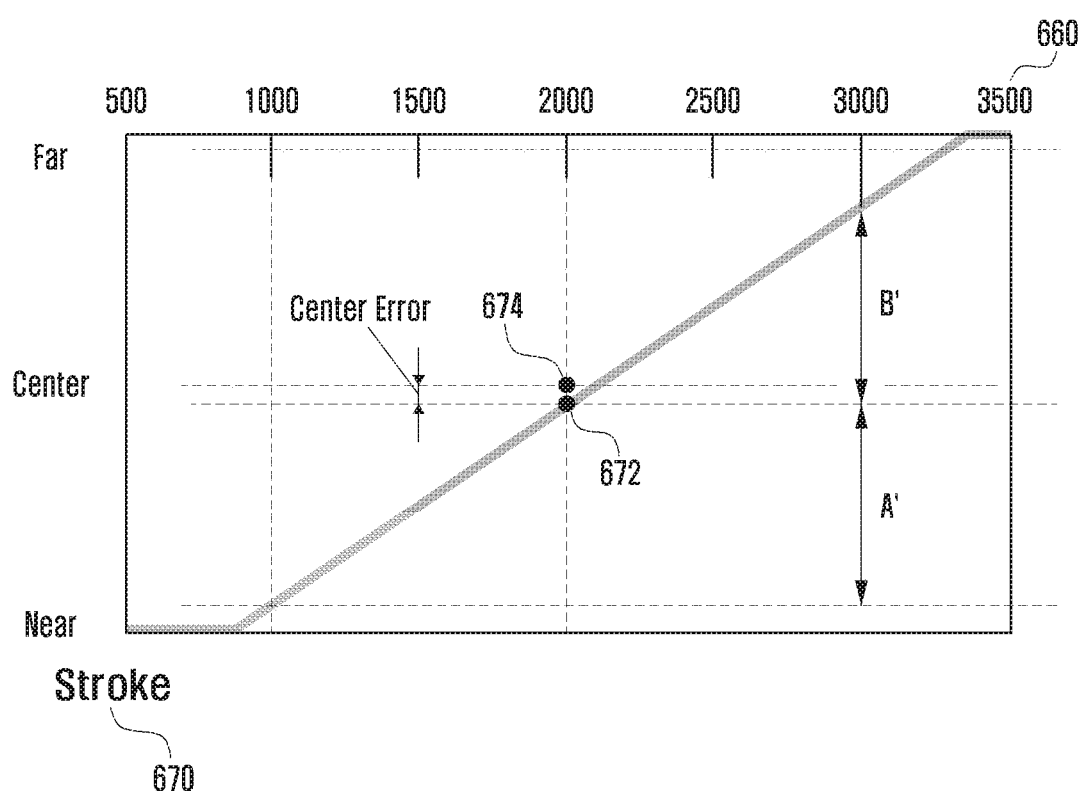

The control circuit 530 may add an offset to the linearized signal 660 so as to perform correction to reduce a center error. FIG. 6D illustrates an example of correction information by which correction is performed to reduce a center error. Referring to FIG. 6D, it may be identified that a difference between a position 672 where a first lens unit (e.g., the first lens unit 512 of FIG. 5) moves according to a signal configured to move the first lens unit to the central region of a first camera (e.g., the first camera 510 of FIG. 5) and the central region 674 of the first camera 510 is significantly reduced compared to a center error shown in FIG. 4B. By reducing the center error, it is possible to guarantee photographing quality in an electronic device (e.g., the electronic device 100 of FIG. 1) for performing photographing using a plurality of camera modules. The center error will be described with reference to FIGS. 7A and 7B.

Figure 7A:
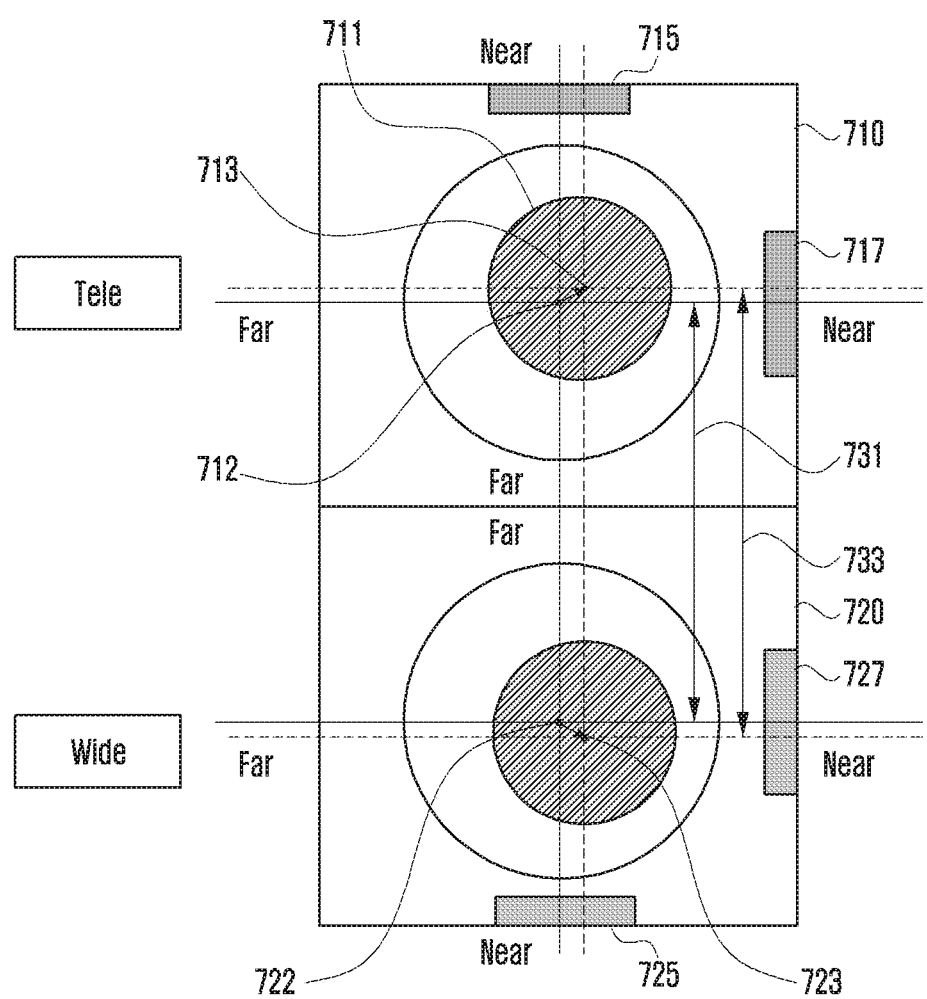
FIGS. 7A and 7B illustrate the position of a lens in a dual camera of an electronic device according to various embodiments of the disclosure.
Figure 7B:
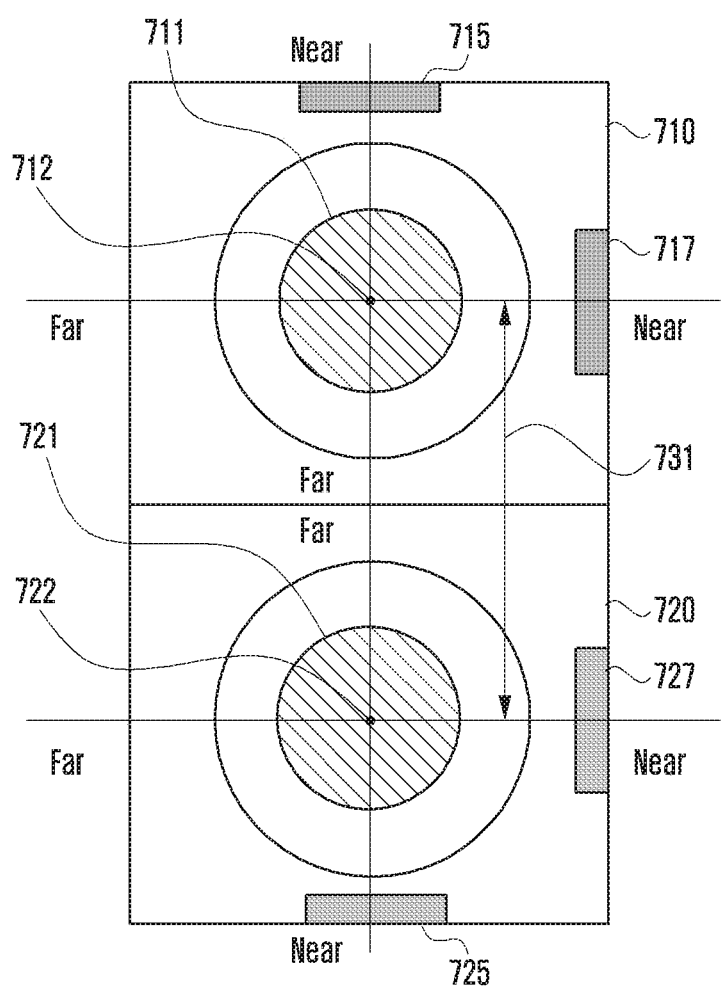

FIGS. 7A and 7B are diagrams illustrating positions of lenses on a dual camera in an electronic device to which a dual camera is applied according to various embodiments of the disclosure.

Recently, a dual camera has been applied to an electronic device capable of supporting an image capture function. The dual camera may be implemented as a telephoto lens and a wide-angle lens. The telephoto lens may be used to photograph a distant subject or an external object. The wide-angle lens may be used to photograph a wide range. The focal length of the telephoto lens may be implemented to be longer than the focal length of the wide-angle lens. FIG. 7A illustrates the positions of lenses in a state in which correction therefor is not performed by a control circuit (e.g., the control circuit 530 of FIG. 5) in an electronic device (e.g., the electronic device 100 of FIG. 1) according to various embodiments of the disclosure.

As described in FIG. 4B, in the case where a signal configured to move a first lens unit 711 (e.g., the first lens unit 512 of FIG. 5) or a second lens unit 721 (e.g., the second lens unit 522 of FIG. 5) to the center of each of a first camera 710 or a second camera 720 is applied, the first lens unit 512 or the second lens unit 522 may move to the vicinity of a Hall sensor (the Hall sensor 340 of FIG. 3) rather than to the center thereof.

Referring to FIG. 7A, it may be identified that the first lens unit 711 is biasedly disposed in a region closer to Hall sensors 715 and 717 than to the center 712 of the first camera 710. It may be identified that the second lens unit 721 is biasedly disposed in a region closer to Hall sensors 725 and 727 than to the center 722 of the second camera 720. In the case where the first lens unit 711 or the second lens unit 721 is biased to one side, the space (stroke margin) in which the first lens unit 711 or the second lens unit 721 is movable in the biased direction is insufficient. In the case where the first lens unit 711 or the second lens unit 721 is biased to one side, it may be identified that a distance 733 (an assembly tilt tolerance, static tolerance) between the center 713 of the first lens unit 711 and the center 723 of the second lens unit 721 increases compared to a distance 731 in the case where the first lens unit 711 or the second lens unit 721 is disposed at the centers 712 and 722 thereof, respectively. In the case where the assembly tilt tolerance increases, a problem such as distortion of a subject may occur while synthesizing images respectively captured by the first camera 710 and the second camera 720. The problem may be further exacerbated due to a center error of a signal output from the Hall sensor.

A control circuit 530 according to various embodiments of the disclosure may perform correction such that a position to which the first lens unit 711 moves according to a signal configured to move the first lens unit to the central region of the first camera 710 is the center 712 of the first camera 710. For example, the control circuit 530 may perform correction in a way of adding an offset to a signal output from the Hall sensor. Through such correction, as shown in FIG. 7B, the electronic device 100 according to various embodiments of the disclosure may dispose the first lens unit 711 or the second lens unit 712 on the central region 712 of the first camera 710 or the central region 722 of the second camera 720. Referring to FIG. 7B, it may be identified that an assembly tilt tolerance 731 is reduced compared to the assembly tilt tolerance 733 of FIG. 7A.

In calculation of the movement amounts of the first lens unit 711 and the second lens unit 721, in order to further reduce the assembly tilt tolerance 731, it is necessary to perform further correction by the optical correction unit. In order to perform precise correction without considering individual differences between optical correction units, a gain value of a gyro sensor (not shown) disposed in an optical image stabilizer may be used. A control circuit 530 according to various embodiments of the disclosure may acquire a first image captured by a first camera 510 and a second image captured by a second camera 520. The control circuit 530 may identify an angular difference value between the first camera 510 and the second camera 520 based on a result obtained by comparing the first image and the second image. The control circuit 530 may calculate a movement amount of an optical correction unit by multiplying the angular difference value by a gain value. The gain value of the gyro sensor is measured in consideration of the product-specific deviation of an optical correction unit and a gyro sensor at the time of production of a camera module. By using the gain value of the gyro sensor, it is possible to perform precise correction without considering the product-specific deviation of the optical correction unit.

An electronic device according to various embodiments of the disclosure may include: a housing; a first camera received in the housing, and including a first lens unit capable of refracting light, reflected from an external object, through one surface of the housing, and a first optical image stabilizer (OIS) capable of correcting the shaking of the first lens unit; a second camera received in the housing, and including a second lens unit capable of refracting light, reflected from the the external object, through the one surface and a second optical image stabilizer capable of correcting the shaking of the second lens unit; and a control circuit, wherein the control circuit is configured to: acquire an image of the external object using the first camera and the second camera; acquire a first signal corresponding to the shaking of the first lens unit and a second signal corresponding to the shaking of the second lens unit during acquisition of the image; identify correction information obtained by such a correction that a designated amount of movement of the first lens unit or the second lens unit is substantially the same as an amount of movement of the first lens unit or the second lens unit according to a signal corresponding to the designated amount of movement of the first lens unit or the second lens unit; determine a control signal on the basis of the first signal, the second signal, and the correction information; and move the first lens unit using the first optical image stabilizer or move the second lens unit using the second optical image stabilizer, based at least on the control signal.

In an electronic device according to various embodiments of the disclosure, the control circuit may be configured to: when a signal, configured to move the position of the first optical image stabilizer or the second optical image stabilizer to a preconfigured position of the first camera or the second camera, is applied, identify the position of the first optical image stabilizer or the second optical image stabilizer, and generate correction information on the basis of a difference between the preconfigured position and the identified position.

In an electronic device according to various embodiments of the disclosure, the preconfigured position is the central position of the first camera or the second camera.

In an electronic device according to various embodiments of the disclosure, the first optical image stabilizer or the second optical image stabilizer includes an optical correction unit capable of moving the lens unit so as to correct the shaking of the lens unit, a signal received by the optical correction unit and corresponding to a designated amount of movement causes a difference between an amount of movement in a first section and an amount of movement in a second section of the lens unit, and the control circuit may be configured to move the first lens unit or the second lens unit on the basis of the correction information obtained by such a correction that the amount of movement in the first section is substantially the same as the amount of movement in the second section.

In an electronic device according to various embodiments of the disclosure, the control circuit may be configured to correct the signal corresponding to the designated amount of movement such that the position of the optical image stabilizer has linearity with respect to the signal corresponding to the designated amount of movement.

In an electronic device according to various embodiments of the disclosure, the optical image stabilizer may include a magnet attached to the housing, and the magnet has a magnetic polarity arranged in a direction perpendicular to the optical axis of the optical unit.

According to an electronic device according to various embodiments of the disclosure, the control circuit may be configured to correct the signal corresponding to the designated amount of movement such that the first lens unit and the second lens unit are disposed at the central position of the first camera and the second camera, respectively.

In an electronic device according to various embodiments of the disclosure, the control circuit may be configured to: acquire two images captured by the first camera and the second camera; identify the angular difference between the first camera and the second camera on the basis of the result obtained by comparing the two images; and determine the moving distance of the first optical image stabilizer and the second optical image stabilizer on the basis of the angular difference and the gain values of gyro sensors of the first optical image stabilizer and the second optical image stabilizer.

According to an electronic device according to various embodiments of the disclosure, the control circuit may be configured to move the first lens unit or the second lens unit such that the shaking of the first lens unit or the second lens unit is reduced based on the control signal.

An electronic device according to various embodiments of the disclosure may include: a housing; a camera received in the housing, and including a lens unit capable of refracting light, reflected from an external object, through one surface of the housing, and an optical image stabilizer (OIS) capable of correcting the shaking of the first lens unit; and a control circuit, wherein the control circuit is configured to: acquire an image of the external object using the camera; acquire a signal corresponding to the shaking of the lens unit during acquisition of the image; identify correction information obtained by such a correction that an amount of movement in a first section of the lens unit is the same as an amount of movement in a second section of the lens unit; and move the lens unit using the optical image stabilizer in a direction in which the shaking of the lens unit is reduced, based on the signal and the correction information.

In an electronic device according to various embodiments of the disclosure, the control circuit may be configured to: when a signal, configured to move the position of the optical image stabilizer to a preconfigured position of the camera, is applied, identify the position of the lens unit, and generate correction information on the basis of a difference between the preconfigured position and the identified position.

In an electronic device according to various embodiments of the disclosure, the preconfigured position is the central position of the camera.

In an electronic device according to various embodiments of the disclosure, the control circuit may be configured to correct the signal corresponding to the designated amount of movement such that the position of the optical image stabilizer has linearity with respect to the signal corresponding to the designated amount of movement.

An electronic device according to various embodiments of the disclosure may be configured to perform the correction of the signal until the lens unit moves to the central position of the camera.

In an electronic device according to various embodiments of the disclosure, the optical image stabilizer includes a magnet attached to the housing, and the magnet has a magnetic polarity arranged in a direction perpendicular to an optical axis of the optical unit.

Figure 8:
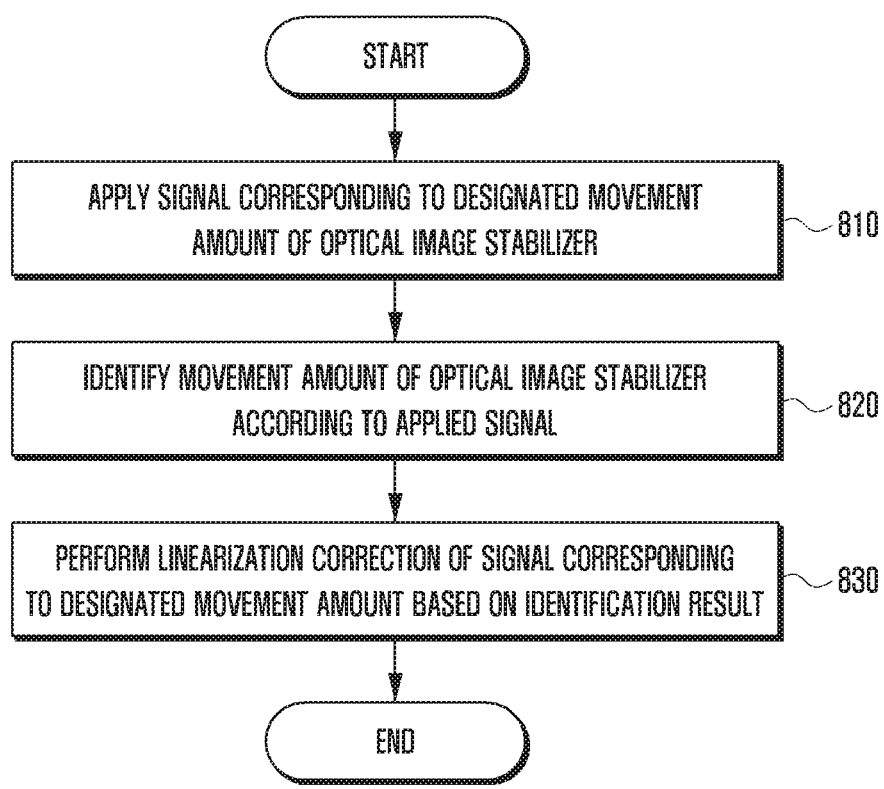
FIG. 8 is an operation flow diagram illustrating an operation method of an electronic device according to various embodiments of the disclosure.

FIG. 8 is an operation flow diagram illustrating an operation method of an electronic device according to various embodiments of the disclosure.

Referring to FIG. 8, in operation 810, a control circuit (e.g., the control circuit 530 of FIG. 5) may apply, to an optical image stabilizer (e.g., the first optical image stabilizer 514 or the second optical image stabilizer 524 of FIG. 5), a signal corresponding to a designated amount of movement of the optical image stabilizer 514 or 524. The signal corresponding to the designated amount of movement of the optical image stabilizer 514 or 524 may be implemented as a code having a value that increases in the direction from a region closest to a Hall sensor (e.g., the Hall sensor 340 of FIG. 3) to a region farthest from the Hall sensor 340, among regions in which a lens unit (e.g., the first lens unit 512 or the second lens unit 522 of FIG. 5) is movable. For example, a signal 440 corresponding to a region closest to the Hall sensor 340 may have a code 500, and a signal 440 corresponding to a region farthest away from the Hall sensor 340 may have a code 3500. According to various embodiments of the disclosure, the control circuit 530 may move the lens unit 310 by applying a signal having a code existing between code 500 and code 3500.

In operation 820, the control circuit 530 may identify an actual movement of the optical image stabilizer 514 or 524 according to the applied signal.

According to various embodiments of the disclosure, the optical image stabilizer 514 or 524 may move the lens unit 512 or 522 according to an applied signal. The control circuit 530 may measure an actual amount of movement of the lens unit 512 or 522 according to the applied signal. As described in FIG. 4B, a signal measured by the hall sensor 340 has a nonlinear characteristics. Due to the nonlinearity of the signal measured by the hall sensor 340, even if a signal difference corresponding to a designated movement amount in the left section and a signal difference corresponding to a designated movement amount in the right section are equal to each other (for example, 1000), the slope of the left section and the slope of the right section with reference to the central region 462 are different from each other, and thus distances by which the lens unit 512 or 522 actually moves may differ. That is, due to the nonlinearity of a signal corresponding to a designated movement amount, the nonlinearity of a signal measured by the Hall sensor 340 may cause a difference between a movement amount in the first section 464 and a movement amount in the second section 466 of the lens unit 512 or 522.

In operation 830, the control circuit 530 may perform linearization correction of a signal corresponding to a designated amount of movement on the basis of the result identified in operation 820. According to various embodiments of the disclosure, by linearizing a signal received by the Hall sensor 340, the slope corresponding to the first section 464 and the slope corresponding to the second section 466 may be the same, thus enabling an amount of movement in the first section 464 and an amount of movement in the second section 466 to be the same. Further, the control circuit 530 may perform correction so as to move the first lens unit 512 to a central region of the first camera 510 or move the second lens unit 522 to a central region of the second camera 520. The control circuit 530 may perform control to move the first lens unit 512 or the second lens unit 522 to a central position of the first camera 510 or the second camera 520, and thus a distance (stroke margin) that the first lens unit 512 or the second lens unit 522 is movable can be increased. Furthermore, in the case of an electronic device to which a dual camera is applied, an assembly tilt tolerance, indicating a distance between the center of the first lens unit 512 and the center of the second lens unit 522, can be reduced.

An operation method of an electronic device according to various embodiments of the disclosure may include: applying a signal corresponding to a designated amount of movement of an optical image stabilizer to a control circuit configured to control at least one optical image stabilizer (OIS) configured to correct the shaking of a lens unit refracting light reflected from an external object; identifying an amount of movement of the optical image stabilizer according to a signal corresponding to the designated amount of movement; and performing linearization correction of a signal corresponding to the designated amount of movement on the basis of the result of identification.

An operation method of an electronic device according to various embodiments of the disclosure may further include performing correction of the signal until the lens unit moves to the center of a camera module including the lens unit and the optical image stabilizer.

In an operation method of an electronic device according to various embodiments of the disclosure, the performing of the correction of the signal corresponding to the designated amount of movement includes: when a signal, which is configured to move the position of the optical image stabilizer to a preconfigured position of the camera module, is applied to the control circuit, identifying the position of the optical image stabilizer; and performing the correction on the basis of a difference between the preconfigured position and the position of the correction unit of the optical image stabilizer.

In an operation method of an electronic device according to various embodiments of the disclosure, the preconfigured position is the central position of the camera module.

In an operation method of an electronic device according to various embodiments of the disclosure, the performing of the correction of the signal corresponding to the designated amount of movement includes performing correction of the signal corresponding to the designated amount of movement such that an amount of movement in a first section of the lens unit is the same as an amount of movement in a second section of the lens unit in the case where the signal corresponding to the designated amount of movement is applied.

In an operation method of an electronic device according to various embodiments of the disclosure, performing the correction of the signal corresponding to the designated amount of movement includes performing correction of the signal corresponding to the designated amount of movement such that a position of the optical image stabilizer has linearity with respect to the signal corresponding to the designated amount of movement.

An operation method of an electronic device according to various embodiments of the disclosure may further include: when two or more camera modules exist, performing linearization correction of a signal corresponding to the designated movement amount, with respect to each of the camera modules.

In an operation method of an electronic device according to various embodiments of the disclosure, the performing of the correction of the signal corresponding to the designated movement amount may further include performing correction of the signal corresponding to the designated movement amount such that a lens unit corresponding to each of the camera modules is disposed at a central position of each of the camera modules.

An operation method of an electronic device according to various embodiments of the disclosure may further include: acquiring two images respectively captured by the two camera modules; identifying an angular difference value between the two camera modules based on the result of comparing the two images; and determining the moving distance of the optical image stabilizer based on the angular difference value and a gain (gyro gain) of a gyro sensor included in the camera module.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a housing;
   a first camera received in the housing, and including a first lens unit capable of refracting light, reflected from an external object, through one surface of the housing, and a first optical image stabilizer (OIS) capable of correcting shaking of the first lens unit;
   a second camera received in the housing, and including a second lens unit capable of refracting light, reflected from the external object, through the one surface of the housing and a second optical image stabilizer capable of correcting shaking of the second lens unit; and
   a control circuit,
   wherein the control circuit is configured to:
      acquire an image of the external object using the first camera and the second camera,
      acquire a first signal corresponding to the shaking of the first lens unit, and a second signal corresponding to the shaking of the second lens unit, during acquisition of the image,
      identify correction information obtained by a correction such that a designated amount of movement of the first lens unit or the second lens unit is substantially the same as an amount of movement of the first lens unit or the second lens unit according to a signal corresponding to the designated amount of movement of the first lens unit or the second lens unit,
      determine a control signal based on the first signal, the second signal, and the correction information, and
      move the first lens unit using the first optical image stabilizer or move the second lens unit using the second optical image stabilizer, based on the control signal.

2. The electronic device of claim 1, wherein the control circuit is further configured to:
   in a case where a signal, configured to move a position of the first optical image stabilizer or the second optical image stabilizer to a preconfigured position of the first camera or the second camera, is applied,
      identify the position of the first optical image stabilizer or the second optical image stabilizer, and
      generate correction information based on a difference between the preconfigured position and the identified position.

3. The electronic device of claim 2, wherein the preconfigured position is a central position of the first camera or the second camera.

4. The electronic device of claim 1,
   wherein the first optical image stabilizer or the second optical image stabilizer comprises an optical correction unit capable of moving each of the lens units so as to correct shaking of the lens units,
   wherein the signal, which has been received in the optical correction unit and corresponds to the designated amount of movement, causes a difference between an amount of movement in a first section and an amount of movement in a second section of the lens units, and
   wherein the control circuit is further configured to move the first lens unit or the second lens unit based on the correction information obtained by such a correction that an amount of movement in the first section is substantially the same as an amount of movement in the second section.

5. The electronic device of claim 1, wherein the control circuit is further configured to correct the signal corresponding to the designated amount of movement such that a position of each of the optical image stabilizers has linearity with respect to the signal corresponding to the designated amount of movement.

6. The electronic device of claim 1,
   wherein each of the optical image stabilizers comprise a magnet attached to the housing, and
   wherein the magnet has a magnetic polarity arranged in a direction perpendicular to an optical axis of an optical unit.

7. The electronic device of claim 1, wherein the control circuit is further configured to correct the signal corresponding to the designated amount of movement such that the first lens unit and the second lens unit are disposed at a central position of the first camera and the second camera, respectively.

8. The electronic device of claim 1, wherein the control circuit is further configured to:
   acquire two images captured by the first camera and the second camera,
   identify an angular difference between the first camera and the second camera based on a result obtained by comparing the two images, and
   determine a moving distance of the first optical image stabilizer and the second optical image stabilizer based on the angular difference and gain values of respective gyro sensors of the first optical image stabilizer and the second optical image stabilizer.

9. The electronic device of claim 1, wherein the control circuit is further configured to move the first lens unit or the second lens unit based on the control signal, so as to reduce the shaking of the first lens unit or the second lens unit.

* * * * *